United States Patent [19]

Kazan

[11] Patent Number: 5,220,316
[45] Date of Patent: Jun. 15, 1993

[54] NONLINEAR RESISTOR CONTROL CIRCUIT AND USE IN LIQUID CRYSTAL DISPLAYS

[76] Inventor: Benjamin Kazan, 557 Tyndall St., Los Altos, Calif. 94022

[21] Appl. No.: 758,522

[22] Filed: Sep. 6, 1991

Related U.S. Application Data

[63] Continuation of Ser. No. 375,133, Jul. 3, 1989, abandoned.

[51] Int. Cl.[5] .............................................. G09B 3/36
[52] U.S. Cl. .................................. 340/784; 340/719; 359/57
[58] Field of Search ................... 340/784, 719, 765; 359/58, 55, 36, 57; 428/329; 338/20, 21; 264/56

[56] References Cited

U.S. PATENT DOCUMENTS

| | | | |
|---|---|---|---|
| 3,555,263 | 1/1971 | Lejon | 364/857 |
| 3,670,183 | 6/1972 | Ager et al. | 338/20 |
| 3,863,193 | 1/1975 | Matsuura et al. | 338/20 |
| 4,233,603 | 11/1980 | Castleberry | 359/58 |
| 4,272,754 | 6/1981 | Lou | 338/20 |
| 4,486,767 | 12/1984 | Fraleux et al. | 359/58 |
| 4,579,702 | 4/1986 | Maruyama et al. | 338/21 |
| 4,731,610 | 3/1988 | Baron et al. | 340/784 |
| 4,741,601 | 5/1988 | Saito | 359/58 |
| 4,748,445 | 5/1988 | Togashi et al. | 340/718 |
| 4,850,679 | 7/1989 | Yamazaki | 359/58 |
| 4,881,797 | 11/1989 | Aoki et al. | 350/339 |
| 4,933,727 | 6/1990 | Mizuma et al. | 355/212 |
| 4,959,262 | 9/1990 | Charles et al. | 338/20 |

OTHER PUBLICATIONS

T. Sato et al., "A Novel Back-to-Back Diode Element for Addressing LCDs", 1987 *Digest of the Society for Information Display*, pp. 59–61.
S. Togashi et al., "An LC-TV Display Controlled by a Si Diode Rings", *Proceedings of the SID*, vol. 26(1), pp. 9–15, 1985.
Z. Yaniv et al., "A New Amorphous-Silicon Alloy PIN Liquid Crystal Display", 1986 *Digest of the Society for Information Display*, pp. 278–280.
D. R. Baraff et al., "The Optimization of Metal-Insulator-Metal Nonlinear devices for Use in Multiplexed Liquid Crystal Displays", *IEEE Transactions on Electron Devices*, vol. ED-28, pp. 736–739, 1981.
D. H. Mash, "An Electroluminescent Digital Indicator With a Silicon Carbide Coding Matrix", *Journal of Scientific Instruments*, vol. 37 pp. 47–50, 1960.
B. Kazan et al., "An Electroluminescent Light-Amplifying Picture Panel", *Proceedings of the IRE*, vol. 42, pp. 1888–1897, 1955.
J. L. Fergason, "Polymer Encapsulated Nematic Crystals for Display and Light Control Applications", 1985 *Digest of the Society For Information Display*, pp. 68–70.
D. E. Castleberry et al., "2″×5″ Varistor-Controlled Liquid Crystal Matrix Display", 1980 *Digest of the Society for Information Display*, pp. 198–199.
J. L. Fergason, "Polymer Polymer Encapsulated Nematic Crystals for Use in a High Resolution and Color Displays", 1986 *Digest of the Society For Information Display*, pp. 126–127.

*Primary Examiner*—Ulysses Weldon
*Assistant Examiner*—Doon Yue Chow
*Attorney, Agent, or Firm*—W. Douglas Carothers, Jr.

[57] ABSTRACT

A control circuit comprises a combination of two or more nonlinear resistor elements having a common electrical junction and a nonlinear current/voltage characteristic, the impedance at the common electrical junction being controlled in accordance with switching voltages applied to the nonlinear resistor elements. These nonlinear resistor elements may be connected to one terminal of a load element, such as a liquid crystal element or a printing element. An array of such load elements, such as printing elements or liquid crystal elements of the microencapsulated type, combined with these nonlinear resistor elements form, respectively, a printing engine or display device. The nonlinear resistor elements are composed of semiconducting or conducting powder particles bonded together with an insulating or semiconducting binder.

14 Claims, 2 Drawing Sheets

NONLINEAR RESISTOR CONTROL CIRCUIT AND USE IN LIQUID CRYSTAL DISPLAYS

This is a continuation of copending application Ser. No. 07/375,133 filed Jul. 3, 1989, now abandoned.

BACKGROUND OF THE INVENTION

This invention relates to switching circuits and in particular to nonlinear resistor control circuits and their applicability to devices for display or printing.

Of the various forms of flat-panel displays being developed for television and other electronic applications, those making use of liquid crystal technology constitute one of the most important types. Much of the interest in such displays derives from their low voltage, low current requirements as well as their low cost and relatively long operating life. In their simplest form, such displays consist of a matrix of twisted nematic liquid crystal elements addressed by means of voltages applied to them by a set of X and Y electrodes. As is well known in the art, however, while such displays can produce satisfactory images when the number of rows of picture elements is limited, their contrast and viewing angle becomes progressively smaller as the number of rows of picture elements is increased. In practice, satisfactory display panels of this type can be made which contain less than about 100 to 200 rows of elements. Although the number of rows can be somewhat increased by using some of the newer forms of liquid crystals materials, such as, the "super-twisted" and ferroelectric types, the long response time of the former and the absence of gray scale of the latter make these alternative approaches unsuitable for television and other applications where images involving motion and containing gray scale are required.

To overcome the limitations of X-Y addressed twisted-nematic displays and allow their use in high-resolution or high-definition-television (HDTV) displays containing a large number of rows of picture elements, a variety of "active matrix" schemes have been developed in which one or more, semiconductor elements are provided for each liquid crystal element. In all these schemes, the semiconductor elements serve to more efficiently block the addressing signals from reaching unselected liquid crystal elements during the line-by-line addressing cycle. In addition, they prevent the capacitive electric charges established across the liquid crystal elements by the signal voltages during addressing from rapidly leaking off the elements between successive addressing cycles, thus increasing the amount of light modulation produced.

The semiconductor elements used for this purpose are generally in the form of field-effect transistors or diodes. These are fabricated from a material such as silicon in amorphous or polycrystalline form to enable the deposition of multi-element arrays at relatively low temperature on a large area substrate. Although displays making use of field effect transistors have received the most attention until now, various factors make this approach difficult. Among these are obtaining a high yield of transistors with the desired electrical characteristics, instability and drift of the transistor characteristics with time, and short circuits occurring at the many crossover points of the conducting lines required for such large arrays of transistor and liquid crystal elements. Since many of these problems are reduced or eliminated when two terminal semiconductor elements are employed, there has been a growing interest in the use of such semiconductor elements in place of the three terminal transistor elements.

Of the various active matrix display devices which incorporate two terminal semiconductor elements, several make use of one or more rectifying diode elements at each liquid crystal element. In one arrangement, as described, for example, in the paper "A Novel Back-to-Back Diode Element for Addressing LCDs" by T. Sato et al., in the 1987 *Digest of the Society for Information Display*, pp. 59–61, a pair of back-to-back rectifying diodes is connected in series with each liquid crystal element. In another arrangement, a pair of parallel diodes of opposite polarity is connected in series with each liquid crystal element as described in the paper, "An LC-TV Display Controlled by a-Si Diode Rings" by S. Togashi et al., in the *Proceedings of the SID*, Vol. 26(1), pp. 9–15, 1985. In a third arrangement, two diodes of the same polarity are connected in series with each other, with the junction of these diodes connected to the liquid crystal element, as described in the paper, "A New Amorphous-Silcon Alloy PIN Liquid Crystal Display" by Z. Yaniv et al. in the 1986 *Digest of the Society for Information Display*, pp. 278–280. In place of rectifying elements, other schemes have also been explored in which an electrically-symmetrical nonlinear resistive element is connected in series with each liquid crystal element. An example of such a scheme is described in the paper, "The Optimization of Metal-Insulator-Metal Nonlinear devices for Use in Multiplexed Liquid Crystal Displays" by D. R. Baraff et al. in the *IEEE Transactions on Electron Devices*, Vol. ED-28, pp. 736–739, 1981.

In all of the above schemes, the fabrication of a large area display, for example, 12"×12" is size or larger, poses several special problems. Aside from the increasing difficulty of avoiding defective circuit elements as the number of picture elements is increased, the costs of panel fabrication are greatly increased since fabrication of the required diode semiconductor elements requires the use of vacuum systems specially designed for processing such large substrates. In addition, since the glass plates confining the liquid crystal layer must be maintained at a uniform spacing, for example, 5 $\mu$m over the entire area, further fabrication problems are encountered.

It is an object of this invention to simplify the basic structure of a display panel or printing array to lower the cost of fabrication and reduce the possibility of defects in a multi-element large area device. Another object of this invention is to enable the fabrication of the semiconductor circuit elements of an image generating device in a normal room environment, thus avoiding the need for processing the device in a vacuum system. Still another object of this invention is to enable the fabrication of a display device on a thin layer of plastic material in which tiny liquid crystal cells are encapsulated, thus avoiding the difficulties of providing conventional liquid crystal layers with uniform thickness over a large area.

SUMMARY OF THE INVENTION

According to this invention, a control circuit comprises a combination of two or more nonlinear resistor elements having a common electrical junction and a nonlinear current/voltage characteristic, the impedance at the common electrical junction being controlled in accordance with bias voltages applied to the nonlinear resistor elements. These nonlinear resistor elements may be connected to one terminal of a load element, such as a liquid crystal element or a printing element or a display element or the like. An array of such load elements, such as printing elements or liquid crystal elements of the micro-encapsulated type, combined with these nonlinear resistor elements form, respectively, a printing engine or display device. The nonlinear resistor elements are composed of semiconducting or conducting powder particles bonded together with an insulating or semiconducting binder.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
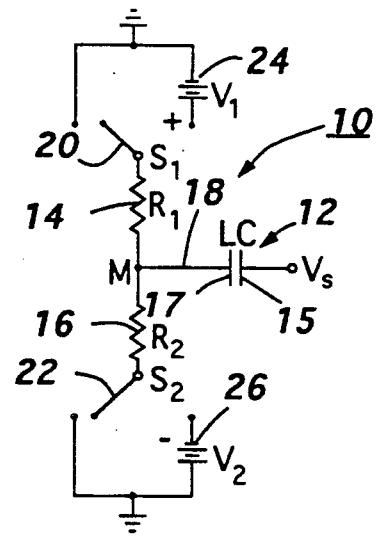
FIG. 1 is a circuit arrangement comprising two nonlinear resistor elements coupled to a single load element.
Figure 2:
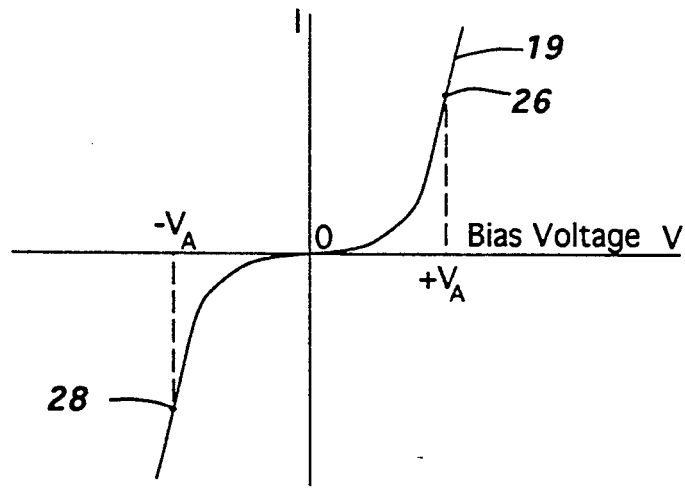
FIG. 2 is a graphic illustration of the nonlinear current/voltage characteristic of the nonlinear resistor elements.

FIG. 1 shows the circuit arrangement 10 of a single element of an image generating device designed in accordance with the present invention. As indicated, a signal voltage, $V_s$, is applied to one terminal of a load element 12, such as a liquid crystal element or a printing element or a display element or the like. For purposes of explanation of the invention, reference will be made to load element 12 as a liquid crystal element (LC) element, although this element may also be a printing element in a marking engine or other type of energizable display element. The other terminal of load element 12 is connected to the junction M of nonlinear resistor elements $R_1$ and $R_2$ at 14 and 16 via conductor 18. Each of these resistors 14 and 16 has a superlinear current/voltage characteristic, such as illustrated in FIG. 2, whereby the current increases, for example, as the fifth or higher power of the applied bias voltage. As shown in FIG. 2, depending on the bias voltage maintained across such a resistor, its incremental resistance can be greatly varied. For example, at a bias voltage close to point 0, the slope of the curve is very low, making the incremental resistance very high, while at bias voltages $+V_A$ or $-V_A$, the slope of the curve is high, making the incremental resistance very low.

With switches $S_1$ and $S_2$ of FIG. 1 at 20 and 22, both held in position 1, essentially no voltage is applied across resistors 14 and 16. Since their incremental impedance is very high, the signal voltage, $V_s$ is prevented from charging LC element 12. However, if both switches 20 and 22 are shifted to position 2, the relatively large voltage difference, i.e., $V_1+V_2$, due to coupling to sources 24 and 26, applied across resistors 14 and 16 results in a substantial current flow through them causing the junction M to have a very low incremental resistance. Assuming that the ratio of the voltages $V_1$ and $V_2$ is properly chosen, point M will also remain at zero potential with a very low impedance to ground. The signal voltage, $V_s$, will now cause a current to flow through the LC element 12, building up a charge across it in accordance with the magnitude of $V_s$, and resulting in a corresponding change in its light transmission.

Figure 3:
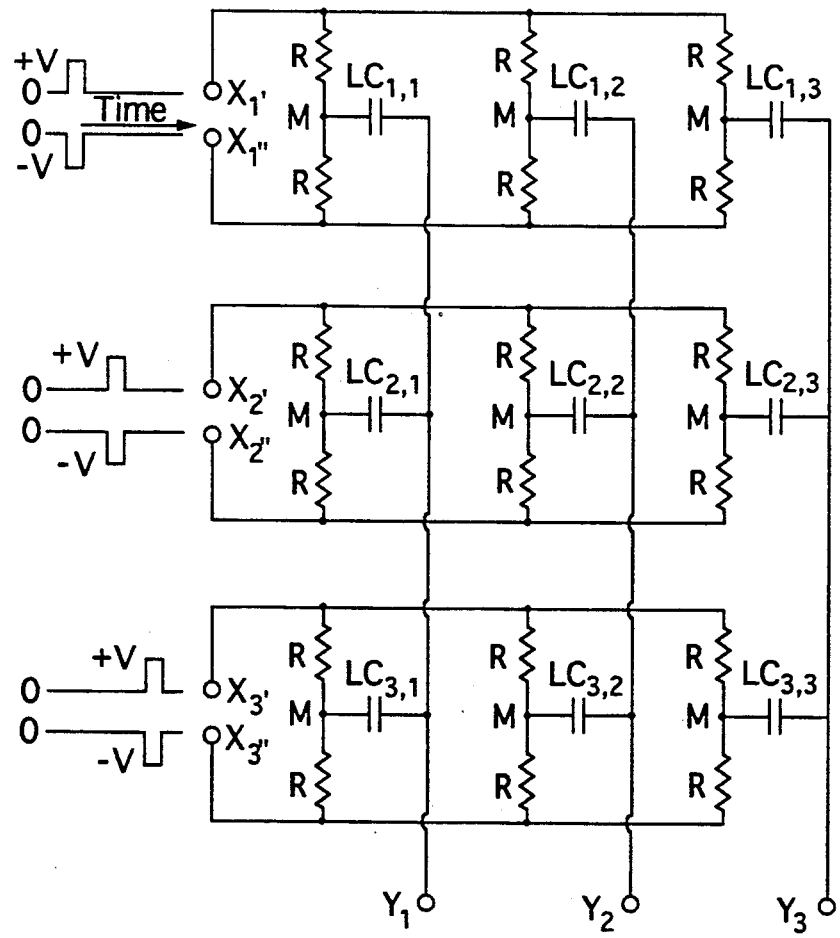
FIG. 3 is an electrical schematic diagram of a nine-element display or printing device comprising this invention.

FIG. 3 illustrates the circuit arrangement of a multi-element display device consisting of picture elements comprising the combination of LC element 12 and nonlinear resistor elements 14 and 16 of FIG. 1. It should be noted that in FIG. 3, to simplify the switching circuit, the two nonlinear resistors 14 and 16 associated with each liquid crystal element 12 are made equal in value, i.e., $R_1=R_2=R$. This also allows the use of switching voltages, $+V$ and $-V$, of equal magnitude. In operation, the rows of LC elements are sequentially addressed. For example, to address the row of LC elements, $LC_{1,1}$, $LC_{1,2}$ and $LC_{1,3}$, pulse voltages $+V$ and $-V$ are applied to the terminals $X_1'$ and $X_1''$, respectively, and video input signals are simultaneously applied to terminals $Y_1$, $Y_2$ and $Y_3$, allowing the liquid crystal elements of this row to be charged in accordance with the magnitude of the signal voltages. During the next time interval, pulses $+V$ and $-V$ are applied to terminals $X_2'$ and $X_2''$ while video input signals are again applied to terminals $Y_1$, $Y_2$ and $Y_3$, resulting in signal voltages appearing across the liquid crystal elements, $LC_{2,1}$, $LC_{2,2}$ and $LC_{2,3}$. In a similar manner, the remaining rows of the array are addressed.

As is commonly the practice in other liquid crystal displays, it may be desirable to reverse the polarity of the addressing signals, $V_s$, on successive frames to avoid any substantial dc bias from appearing across LC elements 12. In addition, if there is any unbalance in the conductivity of the two resistors 14 and 16 associated with a load element 12, a small voltage may appear at the junction M between them when the pulse voltages $+V$ and $-V$, are applied to the pairs of terminals $X'$ and $X''$ of each row of elements. To avoid the effects of this, it may also be desirable, after each successive frame or groups of frames, to reverse the polarity of all the switching voltage pulses, $+V$ and $-V$, applied to the successive rows of load elements 12.

Although various types of nonlinear resistive materials are capable of fulfilling the above requirements, most of these require special preparation procedures such as vacuum deposition of materials or sintering at high temperature, making them incompatible with a polymer substrate. For example, although highly nonlinear resistive elements can be prepared by sintering together suitably doped grains of ZnO, this requires a firing temperature of about 1100° C., well above the melting point or decomposition temperatures of materials such as glass or plastic. The use and properties of such material is described in the paper, "2"×5" Varistor-Controlled Liquid Crystal Matrix Display", by D. E. Castleberry and L. M. Levinson in the 1980 *Digest of the Society for Information Display*, pp. 198-199. To overcome this restriction, the present invention is based on the use of powder binder nonlinear resistance elements composed of small particles of semiconductor or conductive material held in sufficiently close proximity to each other by an insulating or slightly conductive binder to allow current flow to occur such as by electron tunneling from particle to particle. An example of such a powder-binder nonlinear resistance material is described in the paper, "An Electroluminescent Digital Indicator With a Silicon Carbide Coding Matrix" by D. H. Mash in the *Journal of Scientific Instruments*, Vol. 37 pp. 47-50, 1960. In this case, commercially available silicon carbide powders were mixed with a resin binder, producing resistors whose current is proportional to the fifth power of the applied voltage.

Another example of a nonlinear resistor is described in the paper, "An Electroluminescent Light-Amplifying Picture Panel" by B. Kazan and F. H. Nicoll in the *Proceedings of the IRE*, Vol. 42, pp. 1888-1897, 1955, wherein a layer of the nonlinear resistive material, referred to as the "current-diffusing layer", is prepared by mixing a powder of CdS, whose particles have been doped with chlorine, for example, to make them conducting, with a binder of epoxy resin such as Araldite. Alternatively, other binder materials such as ethyl cellulose or polystyrene may be used in place of the epoxy resin. In all cases, however, it is desirable to dilute the resin with a volatile solvent. Upon evaporation of the solvent, the powder grains are then pulled tightly together by the remaining plastic or resin material, enhancing the flow of dc current between the grains. Resistor elements of such CdS materials typically have a current flow also proportional to the fifth or higher power of the applied voltage. It should be noted in this connection that, in large measure, the conductivity of the resultant samples and the degree of nonlinearity of their current-voltage characteristics can be controlled by the choice of particle size, the conductivity of the grains and the amount of plastic or resin material added to a given amount of the semiconductor powder.

Figure 4:
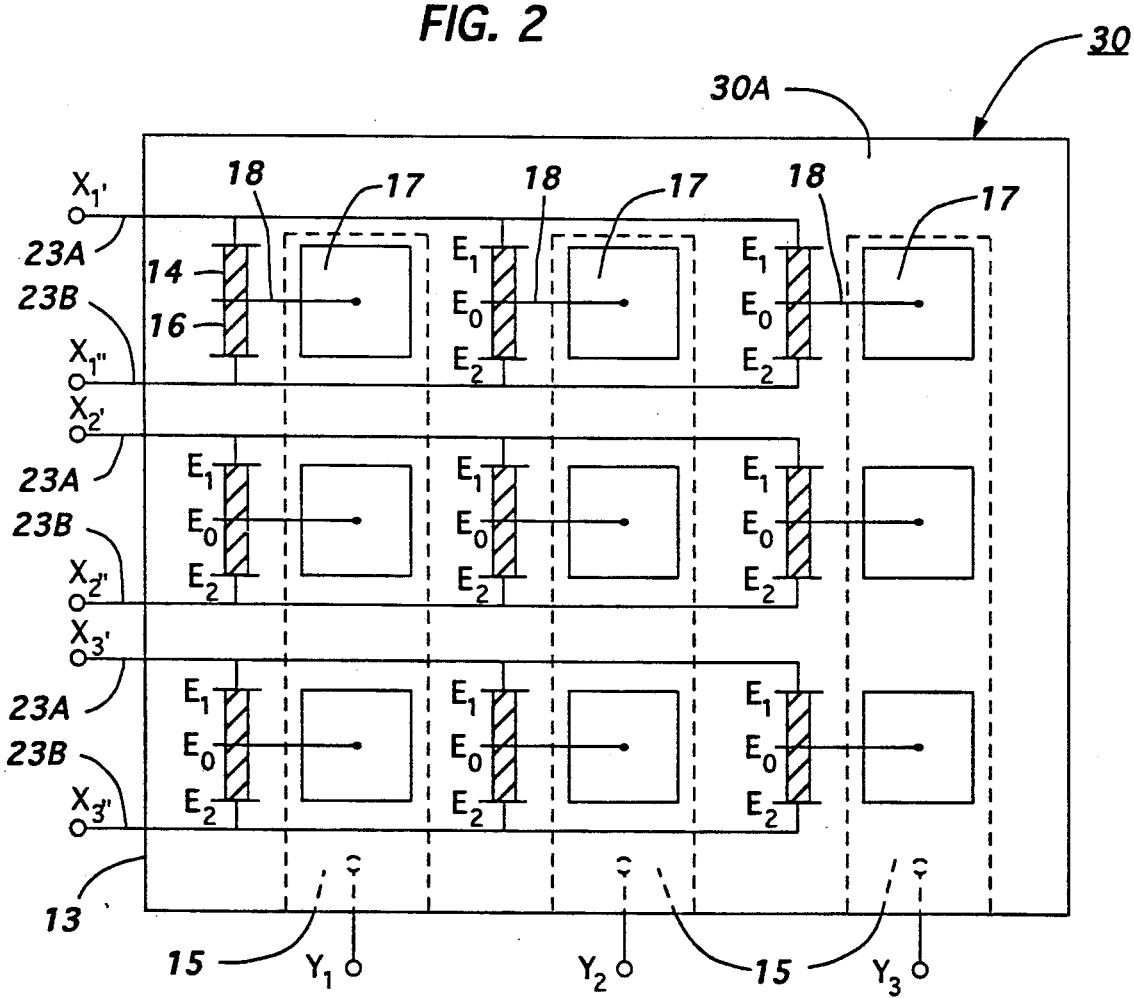
FIG. 4 is a plan view of a nine-element display or printing device comprising this invention.

An example of the physical construction of a display panel incorporating the circuit arrangement of FIG. 3 is shown in FIG. 4. Here the entire display is fabricated on the surface of a large area polymer sheet 13 in which are encapsulated tiny liquid crystal elements 12. Such polymer sheets are described in the paper, "Polymer Encapsulated Nematic Crystals for Display and Light Control Applications" by J. L. Fergason in the 1985 *Digest of the Society For Information Display*, pp. 68-70 and in the paper, "Polymer Encapsulated Nematic Crystals for Use in High Resolution and Color Displays" by J. L. Fergason in the 1986 *Digest of the Society For Information Display*, pp. 126-127.

As indicated in FIG. 4, the display 30 comprises upper electrodes 17, $E_1$, $E_0$, $E_2$ and leads 23A and 23B which are first deposited on the surface of the liquid crystal polymer sheet 13 preferably by a thick-film process. The two nonlinear resistor elements associated with each picture element are then fabricated as a thin layer on the surface of polymer sheet 13 between electrodes $E_1$ and $E_0$ and between $E_2$ and $E_0$, respectively. Resistors 14 and 16, for example, 10-20 μm thick, can also be fabricated by silk screening or other thick-film deposition method. Although electrodes 17 may be deposited in direct contact with liquid crystal polymer sheet 13, it may be desirable before depositing electrodes 17 to coat all other areas of sheet 13 with a thin insulating film 30A of resin or other material to better electronically isolate the nonlinear resistive elements and remaining conducting elements from the underlying liquid crystal polymer sheet 13.

On the opposite or lower surface of sheet 13, transparent conductive electrode strips 15 are provided in registry with the columns of electrodes 17 on the top surface of sheet 13. Top electrodes 17 together with bottom electrodes 15 serve to define the active areas of liquid crystal elements 12. As shown in FIG. 4, transparent electrodes 15 are connected respectively to terminals $Y_1$, $Y_2$ and $Y_3$ to enable electrical addressing of elements 12. Electrodes 15, comprising, for example, indium tin oxide, may be deposited on the rear surface of sheet 13 by well known techniques described in the prior art. However, instead of fabricating electrodes 15 directly on the surface of sheet 13, the lower surface of sheet 13 may be laminated to a thin glass plate of equal area on whose surface transparent electrode strips have been previously deposited or fabricated.

In the case where sheet 13 contains nematic crystal micro-capsules, display device 30 may be viewed in operation by reflected light from the bottom side of sheet 13, through transparent electrodes 15. In this case, it may be desirable for electrodes 17 to be light absorbing, comprising, for example, carbon black in an organic binder, so that liquid crystal elements 12 switched on by addressing signals would become transparent and appear black, while other areas of sheet 13 would appear white or cloudy as a result of the light scattering in these areas. Alternatively, electrodes 17 may be made of a transparent conducting material so that display device 30 may be viewed by transmitted light from either side, using, for example, a broad area light source for rear illumination.

Alternatively, liquid crystal sheet 13 may contain liquid crystal microcapsules with pleochroic dyes, also allowing display 30 to be viewed by reflecting or transmitted light. For producing a full color image, the microcapsules may contain a pleochroic dye mixture which appears opaque black in the OFF state and transparent in the ON state. In this case, successive rows or columns of electrodes 17, which are transparent, may be coated with red, blue and green color filters respectively. Illuminated with a broad area source of white light of selective electroded areas 17 of successive rows or columns may be made to transmit or reflect red, green and blue light respectively. Thus, in accordance with the electrical input signals, a full color image can be produced. To avoid undesired light from reaching the eye from outside the area of electrodes 17 and their corresponding LC elements 12, an opaque mask with apertures in registry with electrodes 17 may be placed over sheet 13.

While the invention has been described in conjunction with a few specific embodiments, it is evident to those skilled in the art that many alternatives, modifications and variations will be apparent in light of the foregoing description. For example, although all of the above discussion has been confined to displays of the liquid crystal type, it should be recognized that the use of nonlinear resistor elements as described above can be used for controlling other types of light modulating elements such as those consisting of electroluminescent thin films, powder electroluminescent layers, electrophoretic layers and electrochromic films as well as controlling a variety of marking or printing elements such as thermal elements, ink jet elements or impact printing elements. Accordingly, the invention is intended to embrace all such alternatives, modifications and variations as fall within the spirit and scope of the appended claims.

What is claimed is:

1. A control circuit for a load element comprising:
   a pair of powder-binder nonlinear resistor elements formed on a surface of a substrate and having one terminal thereof connected to a common electrical junction, said junction connected to said load element, the other terminals of said resistor element pair connected to switching voltage means, the impedance at said common electrical junction being controlled in accordance with switching voltages applied to said other terminals of said resistor pair, said powder-binder resistor elements comprising a non-sintered mixture of a conductive or semiconductive powder particles remaining bonded together with an insulating or low conductivity binder containing a volatile solvent to hold said particles together, said binder remaining intact in said non-sintered mixture after evaporation of said solvent and serving to draw said particles together allowing limited current flow through said non-sintered mixture.

2. The control circuit of claim 1 wherein said conductive powder comprises silicon carbide, cadmium sulfide or zinc oxide particles.

3. The control circuit of claim 2 wherein said binder comprises epoxy resin, ethyl cellulose or polystyrene.

4. The control circuit of claim 1 wherein said load element is an electro-optical display element.

5. The control circuit of claim 4 wherein said electro-optical display element is a polymer-encapsulated liquid crystal material.

6. The control circuit of claim 1 wherein said load element is a printing element.

7. A liquid crystal display comprising
a sheet of micro-encapsulated liquid crystal material,
a plurality of elongated transparent electrodes formed on one surface of said sheet,
an array of pixel electrodes provided on the other surface of said sheet in registry with said elongated electrodes and defining a corresponding array of liquid crystal elements,
a plurality of pairs of powder-binder nonlinear resistor elements formed on said other surface of said sheet, each of said elements comprising a non-sintered mixture of a conductive or semiconductive powder particles bonded together with an insulating or low conductivity organic binder containing a volatile solvent to hold said particles together,
said non-sintered mixture forming said nonlinear resistor elements applied to said other surface of said sheet wherein said binder remains in said mixture after evaporation of said solvent and serving to draw said particles together allowing current flow through said non-sintered mixture, each of said nonlinear resistor element pairs positioned adjacent to a corresponding pixel electrode and with a common junction of each pair connected to a corresponding pixel electrode, the other terminals of said resistor element pairs connected to switching voltage means to receive applied switching voltages, said resistor element pairs having a nonlinear impedance characteristic whereby the current increases therethrough at a higher than linear rate as a function of said applied switching voltages, said other terminals of groups of said nonlinear resistor element pairs connected together in parallel to a common pair of conducting leads allowing a separate switching voltage to be connected to each group, addressing voltage signals applied to said elongated electrodes, said switching voltage applied to said conductive leads of selected group of said nonlinear resistor element pairs to control their nonlinear impedance.

8. The liquid crystal display of claim 7 including an opaque layer with apertures in registry with said pixel electrodes.

9. The liquid crystal display of claim 7 wherein said nonlinear resistor element pairs are located in regions on said sheet which are not above said elongated electrodes.

10. The liquid crystal display of claim 7 wherein said nonlinear resistor elements comprise a silicon carbide powder, cadmium sulfide powder or zinc oxide powder.

11. The liquid crystal display of claim 7 wherein an insulating layer is formed on selected areas of said other surface of said sheet of micro-encapsulated liquid crystal material except in the regions beneath said pixel electrodes.

12. The liquid crystal display of claim 7 wherein the polarity of the switching voltages applied across said other terminal of said resistor element pairs is periodically reversed.

13. The liquid crystal display of claim 7 wherein the polarity of the addressing voltage signals applied to said elongated electrodes is reversed on successive addressing frames thereof.

14. The liquid crystal display of claim 7 wherein said applied switching voltages are adjusted so that the potential at said junction remains close to or at zero.

* * * * *